United States Patent [19]

Ozaki et al.

[11] 4,315,964
[45] Feb. 16, 1982

[54] GLASS FIBER REINFORCED RESIN LAMINATE AND A PROCESS FOR THE MANUFACTURE THEREOF

[75] Inventors: Yukinori Ozaki, Akashi; Hidemi Soda, Daito, both of Japan

[73] Assignee: Nippon Shokubai Kagaku Kogyo, Co., Ltd., Osaka, Japan

[21] Appl. No.: 164,979

[22] Filed: Jul. 1, 1980

[30] Foreign Application Priority Data

Jul. 6, 1979 [JP] Japan .................................. 54-85021
Jun. 5, 1980 [JP] Japan .................................. 55-74927

[51] Int. Cl.$^3$ .............................................. B32B 3/28
[52] U.S. Cl. ...................... 428/182; 428/184; 428/482; 428/483; 156/307.7; 156/313
[58] Field of Search ............... 428/182, 184, 482, 483, 428/522; 156/307.7, 313

[56] References Cited

U.S. PATENT DOCUMENTS

| | | | |
|---|---|---|---|
| 3,265,556 | 8/1966 | Hungerford et al. | 428/215 |
| 3,669,821 | 6/1972 | Sharp | 428/184 |
| 3,919,063 | 11/1975 | Maruyama et al. | 428/482 |
| 4,054,713 | 10/1977 | Sakaguchi et al. | 428/482 |
| 4,242,406 | 12/1980 | Bouhnini et al. | 428/482 |

*Primary Examiner*—J. Travis Brown
*Attorney, Agent, or Firm*—Omri M. Behr

[57] ABSTRACT

A glass fiber reinforced resin laminate comprising a cured layer of glass fiber reinforced resin using an unsaturated polyester resin (I) and a surface layer of polyvinyl fluoride formed on at least one of the opposite surface of the aforementioned cured layer, wherein said unsaturated polyester resin (I) comprises (A) 40 to 80% by weight of an unsaturated polyester derived from an acid moiety containing 20 to 90 mol% of at least one member selected from the group consisting of $\alpha,\beta$-unsaturated polybasic acids and anhydrides thereof and a polyhydric alcohol moiety containing 10 to 40 mol% of diethylene glycol and (B) 60 to 20% by weight of an ethylenically unsaturated monomer containing an amount falling within the range of 0.1 to 0.6 mol, based on mol of the diethylene glycol used in the derivation of said unsaturated polyester (A), of an acrylic ester or methacrylic ester, and, on being cured, exhibits a refractive index within the range of 1.50 to 1.56 at 25° C.

27 Claims, 4 Drawing Figures

GLASS FIBER REINFORCED RESIN LAMINATE AND A PROCESS FOR THE MANUFACTURE THEREOF

FIELD OF THE INVENTION

This invention relates to a glass fiber reinforced resin laminate and to a process for the manufacture thereof. More particularly, this invention relates to a glass fiber reinforced resin laminate excelling in resistance to weather conditions and chemicals and in clarity and to a process for the manufacture thereof.

DESCRIPTION OF THE PRIOR ART

Heretofore, glass fiber reinforced resin sheets obtained by first impregnating glass fibers with an unsaturated polyester resin and subsequently causing the resin in the glass fibers to set have been produced in the form of flat sheets and corrugated sheets and used extensively in greenhouses and other structures or as interior and exterior panels in containers. The glass fiber reinforced resin sheets using the unsaturated polyester resin have a disadvantage that when their resin surface layers are worn out or scraped off after prolonged use and the glass fibers underneath are consequently exposed through the ruptured surface layers, rainwater and liquid chemicals are suffered to pass deeply into the depths of the glass fiber reinforced resin sheets through the phenomenon of capillarity and bring about the rapid total degradation of the sheets. Consequently, these sheets are deprived of not only strength, but also clarity. For use in greenhouses and other structures which are required to retain clarity, particularly in terms of light transmittance, intact for a long time, therefore, these glass fiber reinforced resin sheets available in the form of flat sheets and corrugated sheets have presented unsolved problems.

With a view to overcoming the drawbacks suffered by the glass fiber reinforced resin sheet using the unsaturated polyester, there has been proposed a method which comprises coating the surface of such resin sheet with a layer having a high resin content or a layer formed solely of a resin, thereby enhancing the resistance to weather conditions and chemicals and, at the same time, decreasing the loss of clarity with lapse of time. The effect of this method, however, falls short of meeting the expectations. Another method proposed for the purpose of improvement (U.S. Pat. No. 3,265,556) comprises forming a laminate of the resin sheet by superposing on the surface of the resin sheet a film such as of polyvinyl fluoride excelling in resistance to weather conditions and chemicals thereby preventing the resin sheet from losing its clarity with lapse of time. The polyvinyl fluoride film, however, exhibits poor adhesiveness to the unsaturated polyester resin and often tends to peel off the resin sheet before the film itself begins to shown any sign of degradation.

An object of this invention is to provide a glass fiber reinforced resin laminate excelling in resistance to weather conditions and chemicals and in clarity.

Another object of the present invention is to provide a process for manufacturing the glass fiber reinforced resin laminate possessing the aforementioned properties on a commercial scale with high reproducivility.

SUMMARY OF THE INVENTION

These objects are accomplished by a glass fiber reinforced resin laminate which comprises a cured layer of a glass fiber reinforced resin using an unsaturated polyester resin (I) and a surface layer of polyvinyl fluoride film superposed on at least one of the opposite surfaces of said cured resin layer, wherein the unsaturated polyester resin (I) comprises (A) 40 to 80% by weight of an unsaturated polyester derived from an acid moiety containing 20 to 90 mol% of at least one member selected from the group consisting of $\alpha,\beta$-unsaturated polybasic acids and anhydrides thereof and a polyhydric alcohol moiety containing 10 to 40 mol% of diethylene glycol and (B) 60 to 20% by weight of an ethylenically unsaturated monomer containing an amount falling within the range of 0.1 to 0.6 mol, per mol of the diethylene glycol used in the derivation of the unsaturated polyester (A), of an acrylic ester or methacrylic ester and, on curing, exhibits a refractive index within the range of 1.50 to 1.56 at 25° C.

Further, the aforementioned objects are accomplished by a process for the manufacture of a glass fiber reinforced resin laminate composed of a cured layer of glass fiber reinforced resin and a surface layer of polyvinyl fluoride film superposed on at least one of the opposite surfaces of the cured resin layer, which process comprises impregnating glass fibers with a resin composition resulting from addition of a curing agent system to the aforementioned unsaturated polyester resin (I), interposing the resin-impregnated glass fibers between two films at least one of which is a film of polyvinyl fluoride, and allowing the resin wetting the glass fibers to be cured.

BRIEF EXPLANATION OF THE DRAWINGS

The invention will be best understood from reading the specification in connection with the accompanying drawings, wherein.

PREFERRED EMBODIMENT OF THE INVENTION

Figure 1:
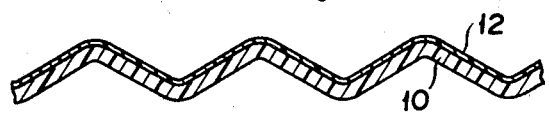
FIG. 1 is a partial cross section of one typical embodiment of the glass fiber reinforced resin laminate according to the present invention.
Figure 2:
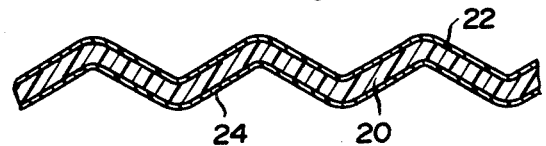
FIG. 2 is a partial cross section of another embodiment of the laminate of this invention.
Figure 3:
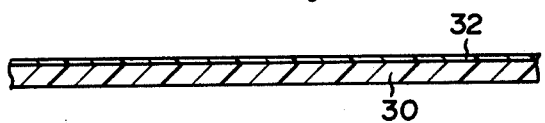
FIG. 3 is a partial cross section of yet another embodiment of the laminate of this invention.
Figure 4:
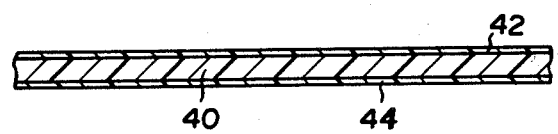
FIG. 4 is a partial cross section of a further embodiment of the laminate of the present invention.

The glass fiber reinforced resin laminate according to the present invention is formed by superposing a surface layer 12 of polyvinyl fluoride film on one surface of a corrugated cured layer 10 of glass fiber reinforced resin as illustrated in FIG. 1. Otherwise, it may be formed by superposing surface layers 22 and 24 of polyvinyl fluoride film one each on the opposite surfaces of a corrugated cured layer 20 of glass fiber reinforced resin as illustrated in FIG. 2. It may further be formed by superposing a surface layer 32 of polyvinyl fluoride resin on one surface of a flat cured layer 30 of glass reinforced resin as illustrated in FIG. 3. It may likewise be formed by superposing surface layers 42 and 44 of polyvinyl fluoride film on the opposite surface of a flat cured layer 40 of glass fiber reinforced resin as illustrated in FIG. 4.

The polyvinyl fluoride film used to form the surface layer of the glass fiber reinforced resin laminate of the present invention may be selected from the various known polyvinyl fluoride films available in the market, of which surface has not been treated with a mold release agent. This film is desired to have a thickness at least 10 microns, preferably falling within the range of 20 to 100 microns. A typical example of such polyvinyl fluoride film is a polyvinyl fluoride film marketed by E. I. Du Pont De Nemours & Co., Inc. under a trademark designation "TEDLAR 100 BG-15UT."

The unsaturated polyester resin (I) to be used in the present invention is composed of (A) an unsaturated polyester and (B) an ethylenically unsaturated monomer. This unsaturated polyester (A) is derived from an acid moiety containing 20 to 90 mol% of at least one member selected from the group consisting of $\alpha,\beta$-unsaturated polybasic acids and anhydrides thereof and a polyhydric alcohol moiety containing 10 to 40 mol% of diethylene glycol. The derivation of the unsaturated polyester (A) from the aforementioned acid moiety and polyhydric alcohol moiety can be effected by any of the methods normally practiced in the art.

Examples of the $\alpha,\beta$-unsaturated polybasic acid or anhydride thereof which is contained by an amount of 20 to 90 mol% in the acid moiety include maleic acid, maleic anhydride, fumaric acid and itaconic acid. Examples of the other polybasic acid or anhydride thereof which is used in conjunction with the $\alpha,\beta$-unsaturated polybasic acid or anhydride thereof to form the acid moiety include phthalic acid, phthalic anhydride, chlorendic acid (hexachloro-endomethylene tetrahydrophthalic acid), chlorendic anhydride, tetrahydrophthalic anhydride, iso-phthalic acid, tetrachloro-phthalic anhydride, tetrabromo-phthalic anhydride, adipic acid, terephthalic acid, succinic acid, sebacic acid, trimellitic acid, benzene tetracarboxylic acid and Diels-Alder reaction products between diene compounds and maleic anhydride such as nadic acid. If the amount of the $\alpha,\beta$-unsaturated polybasic acid or anhydride thereof is less than 20% based on the acid moiety, the unsaturated polyester resin to be obtained becomes too soft. Conversely if the amount exceeds 90 mol%, the heat evolved when the resultant unsaturated polyester resin is cured tends to rise to much as to produce cracks in the resin. Thus any deviation from the reange specified above is undesirable.

Examples of the other polyhydric alcohol which is used in conjunction with diethylene glycol to form the polyhydric alcohol moiety include ethylene glycol, triethylene glycol, propylene glycol, dipropylene glycol, polypropylene glycol, 1,3-butylene glycol, neopenthyl glycol, hydrogenated bis-phenol A, trimethylolpropane monoallyl ether, 2,2,4-trimethyl-1,3-pentane diol, and glycerin. In this case, the diethylene glycol is required to be contained in a amount within the range of 10 to 40 mol% based on the polyhydric alcohol moiety. If the amount of diethylene glycol is less than 10 mol%, the adhesiveness between the resultant unsaturated polyester resin and the polyvinyl fluoride film becomes inferior. Conversely if the amount exceeds 40 mol%, the refractive index which the resultant unsaturated polyester resin exhibits after it has been cured becomes too high and the cured resin becomes soft. Thus, any deviation from the range specified above proves undesirable.

The ethylenically unsaturated monomer (B) to be used in the present invention contains an amount within the range of 0.1 to 0.6 mol, per mol of the diethylene glycol used for the derivation of the unsaturated polyester (A), of a methacrylic ester or acrylic ester. If the amount of the ester is less than 0.1 mol, the adhesiveness between the resultant unsaturated polyester resin and the polyvinyl fluoride film becomes poor. Conversely if the amount exceeds 0.6 mol, the polyvinyl fluoride film melts or swells to a point where the improvement in the resistance to weather conditions and chemicals aimed at by this invention cannot be easily attained.

Examples of the methacrylic ester or acrylic ester to be used in the present invention include methyl methacrylate, ethyl methacrylate, butyl methacrylate, ethylene glycol dimethacrylate, diethylene glycol dimethacrylate, triethylene glycol dimethacrylate, methyl acrylate, ethyl acrylate, butyl acrylate, ethylene glycol diacrylate, diethylene glycol diacrylate, triethylene glycol diacrylate and crotyl acrylate. Examples of the other monomer which is used in conjunction with the methacrylic ester or acrylic ester to form the ethylenically unsaturated monomer (B) include styrene, chlorostyrene, vinyl toluene, vinyl acetate and $\alpha$-methyl styrene.

The unsaturated polyester resin (I) comprises 40 to 80% by weight of the unsaturated polyester (A) and 60 to 20% by weight of the ethylenically unsaturated monomer (B) and, on curing, assumes a refractive index within the range of 1.50 to 1.56 at 25° C. If the refractive index deviates from this range there ensures a disadvantage that the glass fiber reinforced resin laminate to be finally obtained acquires poor clarity. The unsaturated polyester resin (I) can be used as incorporating therein suitable amounts of stabilizer, ultraviolet absorber and other similar additives generally used in the art.

The glass fiber reinforced resin laminate which is obtained by impregnating glass fibers with the unsaturated polyester resin (I) described above and curing the resin as held in contact with the polyvinyl fluoride film offers higher resistance to weather conditions and chemicals and suffers from less degradation of clarity than the conventional glass fiber reinforced resin sheet. If a polybasic acid (II) to be described below is added to the aforementioned unsaturated polyester resin (I) before the resin (I) is cured, then the adhesiveness between the cured layer of glass fiber reinforced resin and the polyvinyl fluoride film is further improved. Consequently, the glass fiber reinforced resin laminate to be obtained possesses still better resistance to weather conditions and chemicals.

The polybasic acid (II) is represented by at least one of the groups of general formulas (I), (2), (3) and (4) indicated herein below.

General Formula (1): $HOOC-(CR_1R_2)_n-COOH$
wherein $R_1$ is H or alkyl having 1 to 4 carbon atoms, $R_2$ is H, hydroxy or alkyl having 1 to 4 carbon atoms, and n is 0 or 1, preferably $R_1$ is H, $R_2$ is H or hydroxy and n is 0 or 1.

General Formula (2): $HOOC-CR_3R_4-CR_5R_6-COOH$
wherein $R_3$ and $R_5$ are each H or alkyl having 1 to 4 carbon atoms, $R_4$ and $R_6$ are each H, hydroxy or alkyl having 1 to 4 carbon atoms, preferably $R_3$ and $R_5$ are each H and $R_4$ and $R_6$ are each H or hydroxy.

General Formula (3): $HOOC-CR_7R_8-CR_9R_{10}-CR_{11}R_{12}-COOH$
wherein $R_7$, $R_9$ and $R_{11}$ are each H, hydroxy or alkyl having 1 to 4 carbon atoms and $R_8$, $R_{10}$ and $R_{12}$ are each H, carboxyl or alkyl having 1 to 4 carbon atoms, preferably $R_7$, $R_9$ and $R_{11}$ are each H or hydroxy and $R_8$, $R_{10}$ and $R_{12}$ are each H or carboxyl.

General Formula (4): $HOOC-CR_{13}=CR_{14}-COOH$ wherein the two-COOH's attach to a carbon-carbon double bond at the cis position and $R_{13}$ and $R_{14}$ are each H or alkyl having 1 to 4 carbon atoms, preferably $R_{13}$ and $R_{14}$ are each H or methyl.

Examples of the polybasic acid represented by General Formula (1) include oxalic acid, malonic acid and tartronic acid. Examples of the polybasic acid represented by General Formula (2) include succinic acid, malic acid and tartaric acid. Examples of the polybasic acid represented by General Formula (3) include glutaric acid, citric acid and dioxy-glutaric acid. Examples of the polybasic acid represented by General Formula (4) include maleic acid and citraconic acid.

As the polybasic acid (II), one or more members selected from the group of polybasic acids described above are used. The amount of the polybasic acid to be used is desired to fall within the range of 0.003 to 0.1 part by weight, preferably 0.005 to 0.05 part by weight, based on 100 parts by weight of the unsaturated polyester resin (I). Of the various polybasic acids enumerated above, oxalic acid proves to be particularly desirable.

The outstanding operation and effect of the present invention are not fully manifested when this polybasic acid (II) is added to the acid moiety or polyhydric alcohol moiety making up the unsaturated polyester (A) before the synthesis of the unsaturated polyester (A) or when it is added while the synthesis is in process. Addition of the polybasic acid (II) to the unsaturated polyester resin (I) may be attained either by homogeneously dissolving the polybasic acid (II) in the ethylenically unsaturated monomer and mixing the resultant solution with the unsaturated polyester resin (I) or by directly adding the polybasic acid (II) to the unsaturated polyester resin (I) and stirring them, with or without application of heat, into a homogeneous solution. Otherwise, the addition may be accomplished by first adding the polybasic acid (II) to the unsaturated polyester (A) and subsequently mixing the resultant mixture with the ethylenically unsaturated monomer (B).

The glass fibers which are used in conjunction with the unsaturated polyester resin (I) to form the cured layer of glass fiber reinforced resin may be selected from the various known types of glass fibers. The form of glass fibers to be used may suitably selected from the various forms such as, glass roving, glass surfacing mat, chopped strand, chopped strand mat, satin weave, plain weave, comber plain weave, and twill weave. The mixing ratio of the unsaturated polyester resin (I) and the glass fibers is desired to fall within the range of 20 to 200 parts by weight, preferably 30 to 100 parts by weight of the latter to 100 parts by weight of the former.

The manufacture of the glass fiber reinforced resin laminate of this invention may be effected by any of the methods described herein below, for example. Of course, these examples are illustrative, and not laminative, of the scope of this invention.

(a) Continuous laminating method

This method produces the glass fiber reinforced resin laminate by the steps of preparing a resin composition by adding the curing agent system to the unsaturated polyester resin (I) or to the mixture of the unsaturated polyester resin (I) with the polybasic acid (II), causing glass fibers impregnated with the resin composition to be continuously interposed between two films, passing the resultant sandwich composite between the two opposed rolls in motion thereby giving a fixed thickness to the composite, and curing the composite in a curing furnace while optionally subjecting the composite to a calendering treatment. At least one of the two films used in this case must be a film of polyvinyl fluoride. The remaining film may be that of polyvinyl fluoride, cellophane or polyester. The type of this film is not specifically limited. It is to be noted that the film of cellophane or polyester readily peels off the unsaturated polyester resin (I) after the resin has been cured.

When the rolls to be used in the operation of this method possess corrugated peripheries, the glass fiber reinforced resin laminates are produced in the form of corrugated sheets.

(b) Resin injection molding method

This method produces the glass fiber reinforced resin laminate by the steps of placing the polyvinyl fluoride film on the internal surface of a closed metal mold, filling the central cavity with glass fibers, forcibly introducing into the mold the resin composition prepared by mixing the unsaturated polyester resin (I) alone or the mixture of the unsaturated polyester resin (I) and the polybasic acid (II) with the curing agent system and heating the mold and its contents to temperatures within the range of 60° to 100° C., thereby curing the resin composition.

(c) Compression molding method

This method produces the glass fiber reinforced resin laminate by the steps of placing the polyvinyl fluoride film on the inner surface of matched metal dies kept at elevated temperatures within the range of 60° to 110° C., further filling the cavity with the resin composition prepared by addition of the curing agent system to the unsaturated polyester resin (I) or the resin composition prepared by addition of the polybasic acid (II) and the curing agent system to the unsaturated polyester resin (I) in conjunction with glass fibers, and subjecting the contents of the mold to compression molding.

(d) Bag molding method

This method produces the glass fiber reinforced resin laminate by the steps of filling a bag made of the polyvinyl fluoride film with the resin composition prepared by addition of the curing agent system to the unsaturated polyester resin (I) or the resin composition prepared by addition of the polybasic acid (II) and the curing agent system to the unsaturated polyester resin (I) in conjunction with glass fibers, and subjecting the bag and its contents to molding and curing while keeping them pressed against a given mold under pneumatic or hydraulic pressure.

(e) Filament winding method

This method produces the glass fiber reinforced resin laminate by the steps of contacting glass fibers with the resin composition prepared by addition of the curing agent system to the unsaturated polyester resin (I) or the resin composition prepared by addition of the polybasic acid (II) and the curing agent system to the unsaturated polyester resin (I) and subjecting the fiber winding around a given mold having a polyvinyl fluoride film on the surface thereof and curing the resin.

In the glass fiber reinforced resin laminate obtained ad described above, the cured layer of glass fiber reinforced resin and the surface layer of polyvinyl fluoride film are integrally cured and powerfully and intimately fastened to each other. The side of the glass fiber reinforced resin laminate containing the surface layer of the polyvinyl fluoride film, exhibits excellent resistance to weather conditions and chemicals.

The curing agent system to be used in this invention may consist solely of a catalyst or may be formed of a catalyst and a promoter. As the catalyst, there can be used one member or a mixture of two or more members selected from the group consisting of ketone peroxides such as methylethyl ketone peroxide and cyclohexanone peroxide; diacyl peroxides such as benzoyl peroxide, parachloro-benzoyl peroxide, 2,4-dichloro-benzoyl peroxide, caprylyl peroxide, lauroyl peroxide and acetyl peroxide; dialkyl peroxides such as di-tertiary-butyl peroxide; alkyl peresters such as t-butyl perbenzoate, t-butyl peracetate, t-butyl peroctoate, t-butyl peroxy isobutyrate and di-tertiary butyl perphthalate; alkyl hydroperoxides such as t-butyl hydroperoxide and cumene hydroperoxide; and percarbonates. The amount of the catalyst to be used falls within the range of 0.3 to 5 parts by weight, preferably 0.5 to 2 parts by weight, based on 100 parts by weight of the unsaturated polyester resin (I). The promoter which is optionally used in conjunction with the catalyst can be selected from the group consisting of metal soaps such as cobalt naphthenate, cobalt octoate, manganese naphthenate, vanadyl octoate and copper naphtenate; quaternary ammonium salts such as lauryl trimethyl ammonium chloride; aliphatic polyamines such as diethylene triamine, pentaethylene hexamine and triethylene pentamine; tertiary amines such as dimethyl aniline and N-n-diethyl aniline; and secondary amines such as diphenyl amine, diethyl amine and dilauryl amine. The amount of the promoter to be used is desired to fall within the range of 0.005 to 2 parts by wieght, preferably 0.01 to 1 parts by weight, based on 100 parts by weight of the unsaturated polyester resin (I).

In the production of the glass fiber reinforced resin laminate according to the present invention, shaping of the resin laminate is accompoished particularly advantageously by using both an alkyl hydroperoxide and a diacyl peroxide as the catalyst and one member or a mixture of two or more members selected from the group consisting of aliphatic polyamines, secondary amines and quaternary ammonium salts as the promoter, optionally in conjucntion with a metal soap. Use of such a catalyst system as described above enables the unsaturated polyester resin (I) to undergo gelation gradually in the course of the shaping process and consequently assume a given shape without deformation and, after the shaping process, cure rapidly. The use of the catalyst system, accordingly, permits the glass fiber reinforced resin laminate shaped such as in the form of a corrugated sheet to be manufactured with high efficiency.

The addition of the curing agent system to the unsaturated polyester resin (I) may be effected either by homogeneously dissolving the catalyst and the promoter respectively in the unsaturated polyester resin (I) to obtain the resin composition and subsequently impregnating glass fibers with the resin composition or by adding the curing agent system to the unsaturated polyester resin (I) and, at the same time, impregnating glass fibers with the resultant resin composition as in the case of the resin injection molding method. The scope of the present invention is not limited by the timing and the manner of the addition of the curing agent system to the unsaturated polyester resin (I).

The glass fiber reinforced resin laminate obtained as described above according to the present invention excels in resistance to weather conditions and chemicals, suffers very little from degradation of clarity by aging and enjoys high light transmittance. The flat or corrugated laminates obtained by the present invention, therefore, are useful as panels in greenhouses and other structures and as enclosures in chemical tanks, for example.

Now, the present invention will be described more specifically below with reference to working examples. In the examples, whenever parts are mentioned, they are meant to be parts by weight unless otherwise specified.

EXAMPLE 1

In a reactor, 100 parts of maleic anhydride, 214.1 parts of tetrahydro-phthalic anhydride, 46.4 parts of diethylene glycol and 123.3 parts of ethylene glycol were stirred under continued introduction of nitrogen gas and application of heat, with the highest temperature fixed at 220° C., to effect a dehydration condensation reaction. Consequently, there was obtained an unsaturated polyester having an acid number of 44. Then by dissolving 64 parts of this unsaturated polyester, 34.5 parts of styrene, 1.5 parts of methyl methacrylate and 0.007 parts of hydroquinone in one another, there was obtained an unsaturated polyeste resin (hereinafter referred to as "resin (I)"). The resin (I), when cured, exhibited a refractive index of 1.55 (as measured at 25° C.; applicable invariably hereinafter).

In a turbine-blade stirrer, 100 parts of the resin (I) and 0.05 part of lauryl trimethyl ammonium chloride were stirred to form a homogeneous solution. Subsequently, this soluditon was stirred in the same stirrer with 1 part of cumene hydroperoxide and 0.4 part of benzoyl peroxide for thorough dissolution. Consequently, there was obtained a resin composition.

Onto a polyvinyl fluoride film (a product of E. I. Du Pont De Nemours & Co., Inc. 25 microns in thickness marketed under a trademark designation "TEDLAR 100 BG-15UT") being moved on a belt conveyor, 100 parts of the resin composition and 30 parts of glass fibers (E glass chopped strand) were supplied and a cellophane film as the release film was laid to drape them. The sandwich composite was passed between two opposed rolls in rotary motion, discharged in a fixed thickness of 0.8 mm, then corrugated by passage through the slit having wave shaped open disposed inside a curing furnace kept at temperatures in the range of 80° to 100° C., then cured by being retained within the furnace for 15 minutes. Thereafter the cellophane film was peeled off. Consequently, there was obtained a corrugated glass fiber reinforced resin laminate (1) containing a surface layer of polyvinyl fluoride film on one surface thereof.

EXAMPLE 2

In a rector, 100 parts of maleic anhydride, 127.4 parts of chlorendic acid, 43.5 parts of diethylene glycol and 58.1 parts of ethylene glycol were stirred under continued introduction of nitrogen gas and application of heat, with the highest temperature fixed at 180° C., to effect a dehydration condensation reaction. Consequently, there was obtained an unsaturated polyester having an acid number of 36. Then, by dissolving 66.6 parts of this unsaturated polyester, 29.9 parts of styrene, 3.5 parts of methyl methacrylate and 0.003 part of hydroquinone in one another, there was obtained an unsaturated polyester resin (hereinafter referred to as "resin (2)"). This resin (2), when cured, exhibited a refractive index of 1.55.

In a turbine blade stirrer, 100 parts of the resin (2) and 0.03 part of a cobalt naphthenate solution (having a metal content of 6%) were stirred to form a homogeneous solution. In the same stirrer, the resultant solution was stirred with 1 part of a dimethyl phthalate solution of 55% methylethyl ketone peroxide (hereinafter referred to as "MEKPO") for thorough dissolution to produce a resin compsotion. By repeating the procedure of Example 1 and using the resin composition, there was obtained a corrugated glass fiber reinforced resin laminate (2) having a surface layer of polyvinyl fluoride film.

EXAMPLE 3

By dissolving 64 parts of the unsaturated polyester obtained in Example 1, 34.5 parts of styrene, 1.5 parts of methyl methacrylate, 0.011 part of oxalic acid and 0.007 part of hydroquinone in one another, there was obtained an unsaturated polyester resin (hereinafter referred to as "resin (3)"). This resin (3), whern cured, exhibited a refractive index of 1.55.

In a turbine blade stirrer, 100 parts of the resin (2) and 0.05 part of lauryl trimethyl ammonium chloride were stirred for thorough dissolution. In the same stirrer, the resultant solution was stirred with 1 part of cumene hydroperoxide and 0.4 part of benzoyl peroxide for thorough dissolution, to afford a resin composition. By repeating the procedure of Example 1 and using the resin composition. There was obtained a corrugated glass reinforced resin laminate (3) having a surface layer of polyvinyl fluoride film.

EXAMPLE 4

By dissolving 66.6 parts of the unsaturated polyester obtained in Example 2, 29.2 parts of styrene, 3.5 parts of methyl methacrylate, 0.005 part of oxalic acid and 0.003 part of hydroquinone in one another, there was obtained an unsaturated polyester resin (hereinafter referred to as "resin (4)"). This resin (4), when cured, exhibited a refractive index of 1.55.

In a turbine blade stirrer, 100 parts of the resin (4) and 0.03 part of a cobalt naphthenate solution (having a metal content of 6%) were stirred for thorough dissolution. Then in the same stirrer, the resultant solution was stirred with 1 part of MEKPO for thorough dissolution, to afford a resin composition. By repeating the procedure of Example 1 and using this resin composition, there was obtained a corrugated glass fiber reinforced resin laminate (4) having a surface layer of polyvinyl fluoride film.

COMPARATIVE EXAMPLE 1

By dissolving 62.4 parts of the unsaturated polyester obtained in Example 1, 33.6 parts of styrene, 4 parts of methyl methacryalte and 0.007 part of hydroquinone in one another, there was obtained an unsaturated polyester resin (hereinafter referred to as "resin (5)"). This resin (5), when cured, exhibited a refractive index of 1.52.

In a turbine blade stirrer, 100 parts of the resin (5) and 0.03 part of a cobalt naphthenate solution (having a metal content of 6%) were stirred for thorough dissolution. Then in the same stirrer, the resultant solution was stirred with 1 part of MEKPO for thorough dissolution, to afford a resin composition. When the procedure of Example 1 was repeated by using this resin composition in an effort to produce a glass fiber reinforced resin laminate, the polyvinyl fluoride film was partially dissolved. Consequently, there was obtained a corrugated sheet having the cured layer of glass fiber reinforced resin partially exposed through the surface layer (comparative corrugated laminate (1)).

COMPARATIVE EXAMPLE 2

In a reactor, 100 parts of maleic anhydride, 64.7 parts of phthalic anhydride, 39.1 parts of dipropylene glycol and 94.2 parts of propylene glycol were subjected to a dehydration condensation reaction by following the procedure of Example 1, to afford an unsaturated polyester having an acid number of 33. Then by dissolving 70 parts of the unsaturated polyester, 30 parts of styrene and 0.007 part of hydroquinone in one another, there was obtained an unsaturated polyester resin (hereinafter referred to as "resin (6)"). The resin (6), when cured, exhibited a refractive index of 1.55.

In a turbine blade stirrer, 100 parts of the resin (6) and 0.05 part of a cobalt naphthenate solution (having a metal content of 6%) were stirred for thorough dissolution. Subsequently in the same stirrer, the resultant solution was stirred with 0.7 part of MEKPO for thorough dissolution, to afford a resin composition. By repeating the procedure of Example 1 and using this resin composition, there was obtained a corrugated glass fiber reinforced resin laminate (comparative corrugated laminate (2)) having a surface layer of polyvinyl fluoride film.

EXAMPLE 5

The corrugated glass fiber reinforced resin laminates obtained in Examples 1-4 and Comparative Examples 1-2 were tested for resistance to boiling water and for clarity. The results of the test are shown in Table 1 below.

TABLE 1

| | Examples | | | | comparative Examples | |
|---|---|---|---|---|---|---|
| | 1 | 2 | 3 | 4 | 1 | 2 |
| Corrugated laminate | c.L. (1) | C.L. (2) | C.L. (3) | C.L. (4) | C.C.L. (1) | C.C.L. (2) |
| Resin used | resin (1) | resin (2) | resin (3) | resin (4) | resin (5) | resin (6) |
| Polybasic acid (2) (amount, parts by weight, based on 100 parts by weight of unsaturated polyester resin) | — | — | oxalic acid | oxalic acid | — | — |
| | 0 | 0 | 0.011 | 0.005 | 0 | 0 |
| Mol % of diethylene glycol in polyhydric alcohol for derivation of unsaturated polyester | 18.1 | 30.3 | 18.1 | 30.3 | 18.1 | 0 |
| Molar ratio of methyl methacrylate to diethylene glycol in unsaturated polyester | 0.23 | 0.38 | 0.23 | 0.38 | 0.65 | 0 |
| Refractive index of resin in cured state (at 25° C.) | 1.55 | 1.55 | 1.55 | 1.55 | 1.52 | 1.55 |
| Resistance to boiling water (in hours)[*1] | 40 | 30 | 50 | 40 | 5 | 5 |

TABLE 1-continued

|  | Examples | | | | comparative Examples | |
|---|---|---|---|---|---|---|
|  | 1 | 2 | 3 | 4 | 1 | 2 |
| Corrugated laminate | c.L. (1) | C.L. (2) | C.L. (3) | C.L. (4) | C.C.L. (1) | C.C.L. (2) |
| Resin used | resin (1) | resin (2) | resin (3) | resin (4) | resin (5) | resin (6) |
| Transmittance of whole light (%)*2 | 89 | 89 | 89 | 89 | 80 | 82 |

*1Indicated in terms of the interval between the time a given corrugated laminate was imersed in boiling water and the time the polyvinyl fluoride film was peeled off the laminate when pried with the tip of a knife.
*2Measured in accordance with Japanese Industrial Standard K-6718.

EXAMPLE 6

In a reactor, 100 parts of maleic anhydride, 31 parts of tetrahydro-phthalic anhydride, 121 parts of phthalic anhydride, 43.3 parts of diethylene glycol, 54.7 parts of dipropylene glycol and 96.2 parts of propylene glycol were stirred under continued introduction of nitrogen gas and application of heat, with the highest temperature fixed at 220° C., to effect a dehydration condensation reaction and afford an unsaturated polyester having an acid number of 32. Then, by dissolving 63.1 parts of this unsaturated polyester, 34 parts of styrene, 2.9 parts of methyl methacrylate, 0.01 part of citric acid and 0.003 part of hydroquinone in one another, there was obtained an unsaturated polyester resin (hereinafter referred to as "resin (7)"). The resin (7), when cured, exhibited a refractive index of 1.55.

In a turbine blade stirrer, 100 parts of the resin (7), 0.01 part of a cobalt naphthenate solution (having a metal content of 6%) and 0.07 part of triethyl benzyl ammonium chloride were stirred for trhugh dissolution. Then, the same stirrer, the resultant solution was stirred with 0.4 part of benzoyl peroxide and 1 part of cumene hydroperoxide for thorough dissolution, to afford a resin composition.

Onto a polyvinyl fluoride film (product of E. I. Du Pont De Numours & Co., INc. 25 microns in thickness marketed under a trademark designation "TEDLAR 100 BG-15UT") being moved on a belt conveyor, 100 parts of the resin composition and 30 parts of glass fibers (E glass, chopped strand) were supplied and a cellophane film as the peel film was laid to drape them. The resultant sandwhich composite was passed between two opposed rolls in rotary motion, discharged in a fixed thickness of 0.8 mm. The sandwich composite issuing from the rolls was seized by the opposite edges thereof with clip tenters travelling synchronously with the belt conveyor, drawn in the direction of width and, at the same time, inserted into the opening between the vertically opposed endless belts disposed within a curing furnace kept at temperatures within the range of 100° to 120° C., pressed for correction of thickness between a group of opposed rolls disposed inside the belt, and then cured by being retained within the furnace for 10 minutes. Then, the cellophane film was peeled off. Consequently, there was obtained a flat glass fiber reinforced resin laminate (1) having a surface layer of polyvinyl fluoride film on one surface thereof.

EXAMPLE 7

By dissolving 66.6 parts of the unsaturated polyester obtained in Example 2, 29.9 parts of styrene, 3.5 parts of methyl methacrylate, 0.01 part of tartaric acid and 0.003 part of hydroquinone were dissolved in one another, there was obtained an unsaturated polyester resin (hereinafter referred to as "resin (8)"). The resin (8), when cured, exhibited a refractive index of 1.55.

In a turbine blade stirrer, 100 parts of the resin (8), 7 parts of tris-chloroethyl phosphate and 3 parts of tris-phenyl phosphate as the flame retardant and 0.03 part of a cobalt naphthenate solution (having a metal content of 6%) as the promoter were stirred for thorough dissolution. Then, in the same stirrer, the resultant solution was stirred with 1 part of MEKPO for thorough dissolution, to afford a resin composition. By repeating the procedure of Example 6 and using this resin composition, there was obtained a flat glass fiber reinforced resin laminate (2) having a surface layer of polyvinyl fluoride film.

EXAMPLE 8

By dissolving 64 parts of the unsaturated polyester obtained in Example 1, 34.5 parts of styrene, 1.5 parts of methyl methacrylate, 0.005 part of tartronic acid, 0.005 part of citraconic acid and 0.007 part of hydroquinone in one another, there was obtained an unsaturated polyester resin (hereinafter referred to as "resin (9)"). The resin (9), when cured, exhibited a refractive index of 1.55.

In a turbine blade stirrer, 100 parts of the resin (9), 0.005 part of diphenyl amine and 0.01 part of triethyl benzyl ammonium chloride were stirred for thorough dissolution. Then in the same stirrer, the resultant solution was stirred with 0.4 part of benzoyl peroxide and 1 part of cumene hydroperoxide for thorough dissolution, to afford a resin composition. By using this resin composition and repeating the procedure of Example 6, except a polyvinyl fluoride film (product of E. I. Du Pont De Nemours & Co., Inc. 25 microns in thickness marketed under a trademark designation "TEDLAR 100 BG-15 UP") was used in the place of the cellophane film, there was obtained a flat glass fiber reinforced resin laminate (3) having surface layers of polyvinyl fluoride film on both opposite surface thereof.

EXAMPLE 9

By dissolving 63.1 parts of the unsaturated polyester obtained in Example 6, 34 parts of styrene, 2.9 parts of methyl methacrylate, 0.008 part of succinic acid and 0.005 part of hydroquinone in one another, there was obtained an unsaturated polyester resin (hereinafter referred to as "resin (10)"). The resin (10), when cured, exhibited a refractive index of 1.55. In a turbine blade stirrer, 100 parts of the resin (10) and 0.05 part of triethyl benzyl ammonium chloride were stirred for thorough dissolution. Then in the same stirrer, the resultant solution was stirred with 0.4 part of benzoyl peroxide and 1 part of cumene hydroperoxide for thorough dissolution, to afford a resin composition.

Onto a preembossed polyvinyl fluoride film (product of E. I. Du Pont De Nemours & Co., Inc. 50 microns in thickness marketed under a trademark designation "TEDLAR 200 BG-15UT") being moved on a belt conveyor, 100 parts of the resin composition and 50 parts of glass fibers (E glass, chopped strand) were supplied and a cellophane film as the peel film was laid to drape them. The resultant sandwich composite was passed between two opposed rolls in rotary motion, discharged in a fixed thickness of 2.5 mm, inserted into one pair of vertically opposed endless belts disposed within a curing furnace kept at temperatures within the range of 80° to 100° C., pressed for correction of thickness between a group of opposed rolls disposed inside the belt and cured by being retained within the furnace for 20 minutes. Then, the cellophane film was peeled off. Consequently, there was obtained a flat glass fiber reinforced resin laminate (4) having a surface layer of polyvinyl fluoride film on one surface thereof.

EXAMPLE 10

The flat glass fiber reinforced resin laminates obtained in Examples 6–9 were tested for resistance to boiling and for clarity. The results of the test are shown in Table 2.

TABLE 2

| | Examples | | | |
|---|---|---|---|---|
| Flat laminate | 6 | 7 | 8 | 9 |
| Resin used | F.L. (1) resin (7) | F.L. (2) resin (8) | F.L. (3) resin (9) | F.L. (4) resin (10) |
| Polybasic acid (2) (amount, parts by weight, based on 100 parts by weight of unsaturated polyester resin) | citric acid 0.01 | tartaric acid 0.01 | tartaric acid 0.005 citroconic acid 0.005 | succinic acid 0.008 |
| Mol % of diethylene glycol in polyhydric alcohol for derivation of unsaturated polyester | 19.6 | 30.3 | 18.1 | 19.6 |
| Molar ratio of methyl methacrylate to diethylene glycol in unsaturated polyester | 0.046 | 0.38 | 0.23 | 0.46 |
| Refractive index of resin in cured state (at 25° C.) | 1.55 | 1.55 | 1.55 | 1.55 |
| Resistance to boiling water (in hours)[*1] | 35 | 40 | 50[*3] | 40 |
| Transmittance of whole light (%)[*2] | 87 | 88 | 85 | 80 |

[*1]Indicated in terms of the interval between the time a given plat laminate was imersed in boiling water and the time the polyvinyl fluoride film was peeled off the laminate when pried with the tip of a knife.
[*2]Measured in accordance with Japanese Industrial STandard K-6718.
[*3]Represents the resisitance offered by the opposite surface layers to boiling water.

EXAMPLE 11

By dissolving 66.3 part of the unsaturated polyester obtained in Example 2, 29.8 parts of styrene, 2.9 parts of methyl methacrylate, 1 part of ethylene glycol diacrylate, 0.01 part of oxalic acid and 0.007 part of hydroquinone were dissolved in one another to afford an unsaturated polyester resin (hereinafter referred to as "resin (11)"). The resin (11), when cured, exhibited a refractive index of 1.55. In the resin (11), the mol percentage of diethylene glycol in the polyhydric alcohol moiety of the unsaturated polyester was 30.5% and the total molar ratio of the methacrylic ester (methyl methacrylate) and the acrylic ester (ethylene glycol diacrylate) in the ethylenically unsaturated monomer to the diethylene glycol was 0.42.

In a turbine blade stirrer, 100 parts of the resin (11) and 0.1 part of a cobalt naphthenate solution (having a metal content of 6%) were stirred for thorough dissolution. Then, in the same stirrer, the resultant solution was stirred with 1 part of MEKPO and 0.2 part of benzoyl peroxide for thorough dissolution, to afford a resin composition.

Separately, in a pair of matched dies composed of an outer shell and an inner shell made of FRP, provided on the outer flanges thereof with a rubber pinch-off and possessed of a cup-shaped cavity 1 m in diameter and 3 mm in thickness, a polyvinyl fluoride film (product of E. I. Du Pont De Nemours & Co., Inc. marketed under a trademark designation "TEDLAR 100 BG-15UT") 25 microns in thickness prefabricated to the shape of a cup was set in position on the inner surface of the outer shell and a polyvinyl fluoride film (product of E. I. Du Pont De Nemours & Co., Inc. marketed under a trademark designation "TEDLAR 200BG-15UT") 50 microns in thickness prefabricated similarly in the shape of a cup was set in position on the inner surface of the inner shell. Glass fibers (E glass, chopped strand mat) were interposed between the two films in the dies. Then, the resin composition prepared as described above was forcibly introduced via the resin inlet port into the cavity enclosed with the two films to impregnate the glass fibers. The dies and the contents were left to stand in a room kept at 60° C. for 20 minutes and then at an elevated temperature of 100° C. for 20 minutes to cure the resin composition. Consequently there was obtained a cup-shaped laminate having surface layers of polyvinyl fluoride film on the opposite surfaces thereof. By joining two such cup-shaped laminates edge to edge, there was obtained a globular water tank excelling in resistance to weather conditions and chemicals.

What is claimed is:

1. A glass fiber reinforced resin laminate comprising a cured layer of glass fiber reinforced resin using an unsaturated polyester resin (I) and a surface layer of polyvinyl fluoride formed on at least one of the opposite surfaces of the aforementioned cured layer, wherein said unsaturated polyester resin (I) comprises (A) 40 to 80% by weight of an unsaturated polyester derived from an acid moiety containing 20 to 90 mol% of at least one member selected from the group consisting of $\alpha,\beta$-unsaturated polybasic acids and anhydrides thereof and a polyhydric alcohol moiety containing 10 to 40 mol% of diethylene glycol and (B) 60 to 20% by weight of an ethylenically unsaturated monomer containing an amount falling within the range of 0.1 to 0.6 mol, based on mol of the diethylene glycol used in the derivation of said unsaturated polyester (A), of an acrylic ester or methacrylic ester, and, on being cured, exhibits a refractive index within the range of 1.50 to 1.56 at 25° C.

2. A laminate according to claim 1, wherein the glass fiber reinforced resin laminate is in the form of a corrugated sheet.

3. A laminate according to claim 1, wherein the glass fiber reinforced resin laminate is in the form of a flat sheet.

4. A laminate according to claim 1, wherein the surface layer of polyvinyl fluoride is formed on one surface of the cured layer of resin.

5. A laminate according to claim 1, wherein the surface layer of polyvinyl fluoride is formed on each of the opposite surfaces of the cured layer of resin.

6. A laminate according to claim 1, wherein the resin to be used in the formation of the glass fiber reinforced resin laminate contains 0.003 to 0.1 part by weight, based on 100 parts by weight of the unsaturated polyester resin (I), of a polybasic acid (II) represented by at least one of the four general formulas indicated below:

General Formula (1): $HOOC-CR_1R_2)_nCOOH$ wherein $R_1$ is H or alkyl having 1 to 4 carbon atoms, $R_2$ is H, hydroxy or alkyl having 1 to 4 carbon atoms, and n is 0 or 1;

General Formula (2): $HOOC-CR_3R_4-CR_5R_6-COOH$ wherein $R_3$ and $R_5$ are each H or alkyl having 1 to 4 carbon atoms, $R_4$ and $R_6$ are each H, hydroxy or alkyl having 1 to 4 carbon atoms;

General Formula (3): $HOOC-CR_7R_8-CR_9R_{10}-CR_{11}R_{12}-COOH$ wherein $R_7$, $R_9$ and $R_{11}$ are each H, hydroxy or alkyl having 1 to 4 carbon atoms and $R_8$, $R_{10}$ and $R_{12}$ are each H, caroboxyl or alkyl having 1 to 4 carbon atoms; and General Formula (4): $HOOC-CR_{13}=CR_{14}-COOH$ wherein the two —COOH's attach to a carbon-carbon double bond at the cis position and $R_{13}$ and $R_{14}$ are each H or alkyl having 1 to 4 carbon atoms.

7. A laminate according to claim 6, wherein the polybasic acid (II) is a compound represented by at least one of the four general formulas indicated below:
General Formula (1), wherein, $R_1$ is H, $R_2$ is H or hydroxy and n is 9 or 1;
General Formula (2), wherein $R_3$ and $R_5$ are each H and $R_4$ and $R_6$ are each H or hydroxyl;
General Formula (3), wherein $R_7$, $R_9$ and $R_{11}$ are each H or hydroxy and $R_8$, $R_{10}$ and $R_{12}$ are each H or carboxyl; and
General Formula (4), wherein $R_{13}$ and $R_{14}$ are each H or methyl.

8. A laminate according to claim 7, wherein the polybasic acid (II) is oxalic acid.

9. A laminate according to claim 6, wherein the polybasic acid (II) is contained in an amount within the range of 0.005 to 0.05 part by weight based on 100 parts by weight of the unsaturated polyester resin (I).

10. A laminate according to claim 6, wherein the glass fiber reinforced resin laminate is in the form of a corrugated sheet.

11. A laminate according to claim 6, wherein the glass fiber reinforced resin laminate is in the form of a flat sheet.

12. A laminate according to claim 6, wherein the surface layer of polyvinyl fluoride is formed on one surface of the cured layer of resin.

13. A laminate according to claim 6, wherein the surface layer of polyvinyl fluoride is formed on each of the opposite surfaces of the cured layer of resin.

14. A process for the manufacture of a glass fiber reinforced resin laminate, comprising the steps of impregnating glass fibers with a resin composition prepared by adding a curing agent system to an unsaturated polyester resin (I) which comprises (A) 40 to 80% by weight of an unsaturated polyester derived from an acid moiety containing 20 to 90 mol% of at least one member selected from the group consisting of $\alpha,\beta$-unsaturated polybasic acids and anhydrides thereof and a polyhydric alcohol moiety containing 10 to 40 mol% of diethylene glycol and (B) 60 to 20% by weight of an ethylenically unsaturated monomer containing an amount falling within the range of 0.1 to 0.6 mol, based on mol of the diethylene glycol used in the derivation of said unsaturated polyester (A), of an acrylic ester or methacrylic ester, and, on being cured, exhibits a refractive index within the range of 1.50 to 1.56 at 25° C., interposing the impregnated glass fibers between two films at least one of which is a polyvinyl fluoride, and curing the resin composition.

15. A process according to claim 14, wherein the curing agent system comprises a catalyst formed of an alkyl hydroperoxide and a diacyl peroxide and at least one promoter selected from the group consisting of aliphatic polyamines, secondary amines and quaternary ammonium salts.

16. A process according to claim 15, wherein the promoter is used in combination with a metal soap.

17. A process according to claim 14, wherein the resin laminate is corrugated by molding.

18. A process according to claim 14, wherein one of the two opposed films is a polyvinyl fluoride film.

19. A process according to claim 14, wherein the two opposed films are both polyvinyl fluoride films.

20. A process according to claim 14, wherein the resin to be used in the formation of the glass fiber reinforced resin laminate contains 0.003 to 0.1 part by weight, based on 100 parts by weight of the unsaturated polyester resin (I), of the polybasic acid (II) defined in claim 6.

21. A process according to claim 20, wherein the polybasic acid (II) is a compound represented by at least one of the four general formulas indicated below:
General Formula (1), wherein, $R_1$ is H, $R_2$ is H or hydroxy and n is 0 or 1;
General Formula (2), wherein $R_3$ and $R_5$ are each H and $R_4$ and $R_6$ are each H or hydroxy;
General Formula (3), wherein $R_7$, $R_9$ and $R_{11}$ are each H or hydroxy and $R_8$, $R_{10}$ and $R_{12}$ are each H or carboxyl; and
General Formula (4), wherein $R_{13}$ and $R_{14}$ are each H or methyl.

22. A process according to claim 20, wherein the polybasic acid (II) is oxalic acid.

23. A process according to claim 20, wherein the curing agent system comprises a catalyst formed of an alkyl hydroperoxide and a diacyl peroxide and at least one promoter selected from the group consisting of aliphatic polyamines, secondary amines and quaternary ammonium salts.

24. A process according to claim 23, wherein the promoter is used in combination with a metal soap.

25. A process according to claim 20, wherein the resin laminate is corrugated by molding.

26. A process according to claim 20, wherein one of the two opposed films is a polyvinyl fluoride film.

27. A process according to claim 20, wherein the two opposed films are both polyvinyl fluoride films.

* * * * *